US006935789B2

(12) United States Patent
Gross, III et al.

(10) Patent No.: US 6,935,789 B2
(45) Date of Patent: Aug. 30, 2005

(54) FIBER OPTIC CONNECTOR WITH LONG TERMINUS MOVEMENT AND MODERATE LENGTH

(75) Inventors: Russell Frederick Gross, III, Riverside, CA (US); Peter Joseph Hyzin, Trabuco Canyon, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 36 days.

(21) Appl. No.: 10/387,207

(22) Filed: Mar. 11, 2003

(65) Prior Publication Data

US 2004/0179786 A1 Sep. 16, 2004

(51) Int. Cl.$^7$ .............................................. G02B 6/38
(52) U.S. Cl. ......................................... 385/78; 385/59
(58) Field of Search ............................. 385/78, 60, 59, 385/72, 87, 76, 58, 56, 55, 53

(56) References Cited

U.S. PATENT DOCUMENTS

| 5,016,970 A | 5/1991 | Nagase et al. ............ 350/96.21 |
|---|---|---|
| 5,121,454 A | 6/1992 | Iwano et al. ................. 385/60 |
| 5,129,023 A | 7/1992 | Anderson et al. ............. 385/70 |
| 5,404,416 A | 4/1995 | Iwano et al. ................. 385/60 |
| 5,537,501 A | 7/1996 | Iwano et al. ................. 385/58 |
| 5,673,346 A | 9/1997 | Iwano et al. ................. 385/60 |
| 5,862,282 A | 1/1999 | Matsuura et al. ............. 385/86 |
| 6,238,099 B1 | 5/2001 | Le Guen et al. ............. 385/59 |
| 6,309,112 B1 | 10/2001 | Lecomte ...................... 385/59 |
| 6,722,789 B1 * | 4/2004 | Hyzin et al. ................. 385/78 |
| 2002/0150348 A1 * | 10/2002 | Nguyen ....................... 385/59 |

* cited by examiner

Primary Examiner—Frank G. Font
Assistant Examiner—James P. Hughes
(74) Attorney, Agent, or Firm—Roger C. Turner

(57) ABSTRACT

An optic fiber connector has a terminus (24) with a front tip (110) that lies at an initial position at which the tip is at least flush with or forward of the surrounding housing front surface (112) and which is moved rearwardly by a mating terminus (22) so the tips of the termini are halfway between front and rear ends (132, 134) of an alignment sleeve (34). The housing has a peripheral portion (120) that projects forward of the ferrule front tips to protect them even though they project forward of the housing front surface. The alignment sleeve has a short length (A) that is about three times its inside diameter (C), and a long spring (84) is used to bias the terminus forwardly and maintain a substantially constant forward force on the terminus, the spring having an initial length (B) which is at least 150% of the alignment sleeve length. A plug (96) that holds the alignment sleeve in place, has an internal bore with a rear bore portion (154) that receives the front end of the terminus body (90). A retainer (100) includes a clip holder (102) with a holder rear portion (172) surrounded by the spring.

9 Claims, 3 Drawing Sheets

FIBER OPTIC CONNECTOR WITH LONG TERMINUS MOVEMENT AND MODERATE LENGTH

BACKGROUND OF THE INVENTION

Optic fiber connectors commonly include a housing with one or more through passages that each holds a ferrule that is biased forwardly by a spring. An alignment sleeve may lie at the front of the passage, to align the tips of the terminus ferrule and of a mating ferrule device. The tip of the ferrule is commonly moved rearwardly, against the force of the spring, from a position about one-third of the way from the front end of the alignment sleeve to a position halfway from the front end, when the mating ferrule device is inserted into the sleeve. The alignment sleeve, which is generally formed of a ceramic for high precision, has a slot that allows it to expand to tightly grasp the ferrules lying within it. This requires a large spring force such as 2.5 pounds for a ferrule of about 1.6 mm diameter. A spring of appreciable length is used to maintain a substantially constant forward force on the terminus while it slides between the two above-mentioned positions.

Occasionally, the tips of ferrules must be cleaned. Since the tip of one ferrule lies deep within the alignment sleeve, it can be difficult to clean the tip. Cleaning is required to remove dust particles, etc. that would prevent the tips of the ferrules from precisely abutting one another or that can scratch them. An optic fiber connector that facilitated cleaning of the ferrule tips by allowing much greater ferrule movement between its extreme positions, while still providing some protection for the ferrule tips when not mated to other ferrules, and while minimizing the extra length of the connector required for a longer spring to maintain a constant force on the terminus, would be of value.

SUMMARY OF THE INVENTION

In accordance with one embodiment of the present invention, an optic fiber connector is provided, of the type wherein the ferrule is biased to an initial position wherein it projects into an alignment sleeve, which facilitates cleaning of the tip of the ferrule and which minimizes the overall length of the connector. A stop that limits forward movement of the terminus by the spring, positions the tip of the terminus so it lies flush with or slightly forward of the front surface of the surrounding housing front surface. The housing has a peripheral housing portion that projects forward of the ferrule front tip to protect the ferrule tip.

The movement of the terminus between its forward position wherein it lies slightly forward of the housing front surface and its rearward position wherein it lies halfway between opposite ends of the alignment sleeve, is minimized by minimizing the length of the alignment sleeve to about one-third its inside diameter. A substantially constant spring force on the terminus is obtained by using a spring of a length at least 150% of the alignment sleeve length.

A plug that holds the alignment sleeve in a front portion of the housing passage, has an enlarged rear plug opening to receive the front of the terminus body to reduce the require overall length of the connector. A retention device that holds a retention clip, has a reduced outside diameter rearward portion that receives the front portion of the spring, to reduce the overall length of the connector.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
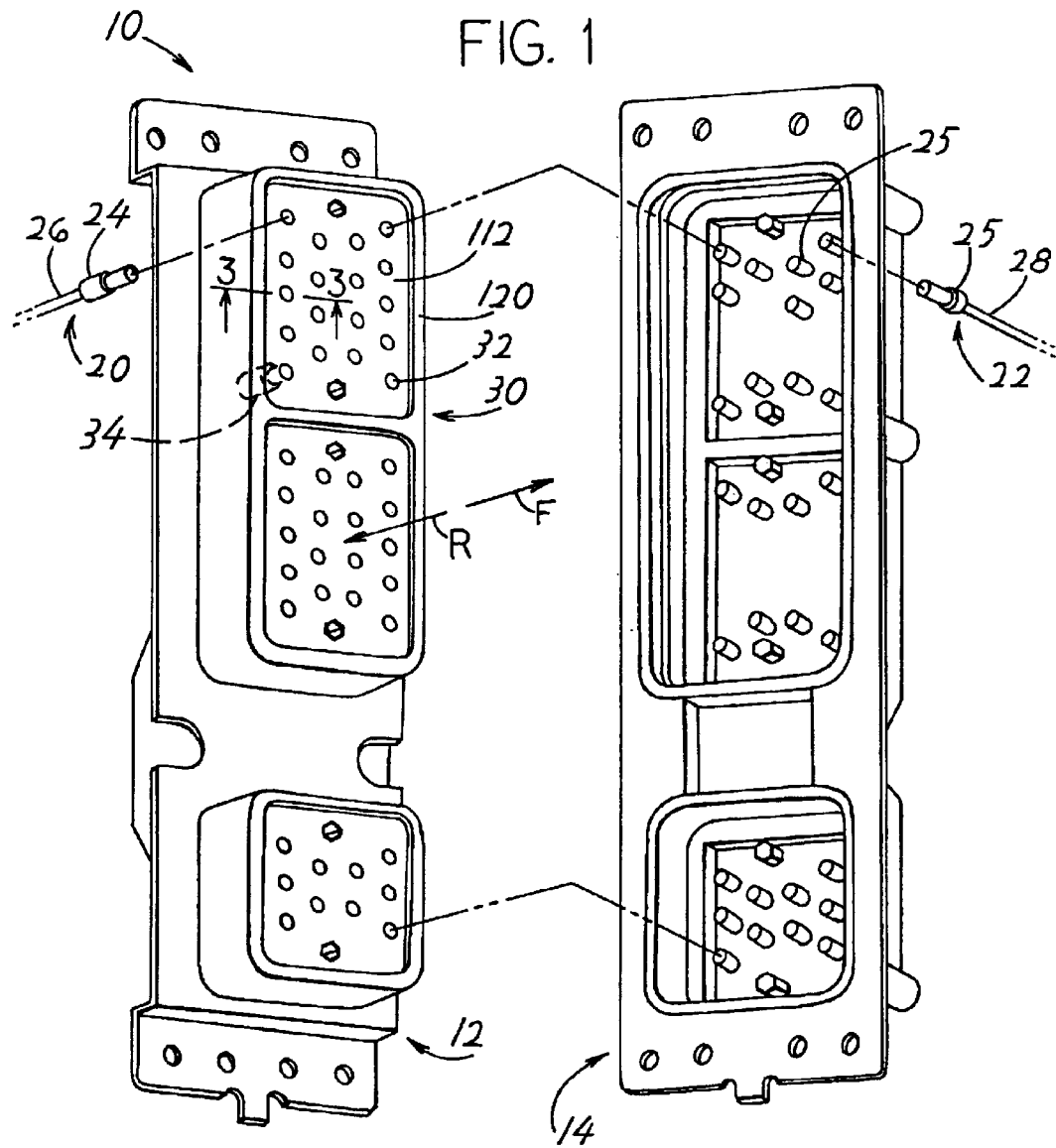
FIG. 1 is an isometric view of a connector of the present invention.

FIG. 1 illustrates an optic fiber connector system 10 which includes a connector 12 and a mating connector, or connector device 14. Each connector and connector device holds multiple terminus assemblies 20, 22 that each includes a terminus 24, 25 and an optic fiber cable 26, 28. The connector 12 includes a housing 30 with multiple through passages 32 that each extends in forward F and rearward R directions completely through the housing. Each passage holds an alignment sleeve 34, as well as a terminus 24. When the connectors mate, a mating terminus 25 of the connector device 14 projects partially into one of the through passages 32 in the connector, and partially through one of the alignment sleeves 34.

Figure 2:
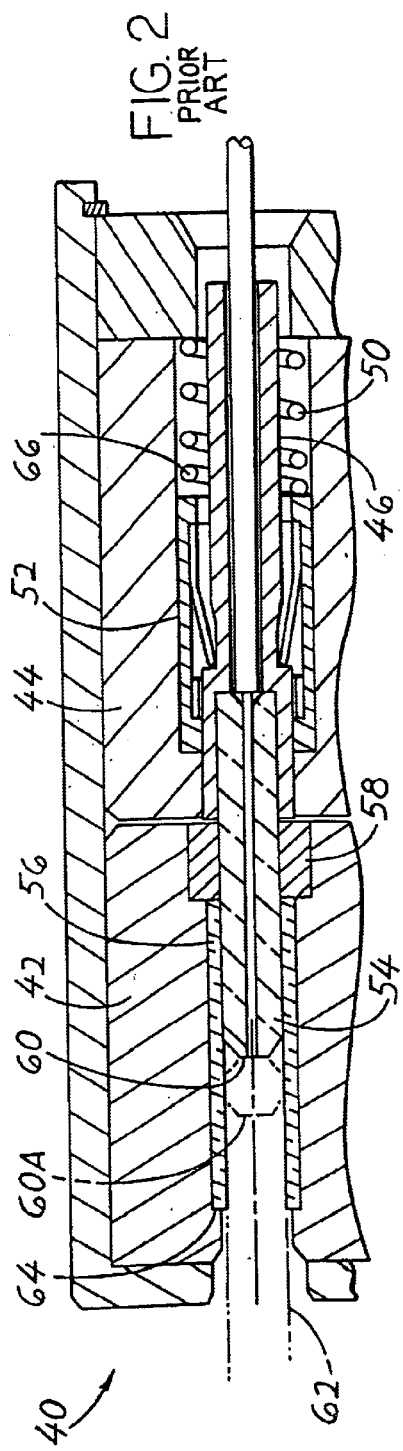
FIG. 2 is a sectional view of a pair of mating connectors of a prior development.

FIG. 2 illustrates a prior connector 40 that applicant previously designed, which included a housing with front and rear housing parts 42, 44. A terminus 46 was inserted into the rear housing part and biased forwardly by a spring 50 that pushed a retainer 52 forwardly. The ferrule 54 of the terminus projected into an alignment sleeve 56 that was held in place by an interference fit plug 58. The ferrule 54 had a tip 60 that projected halfway through the alignment sleeve when a mating ferrule device 62 was fully installed. When no mating ferrule device was installed, the tip lay at 60A, about one-third from the front end 64 of the alignment sleeve. It was difficult to clean the ferrule tip at 60A, and disassembly to gain access to the tip is difficult. A spring 66 of only moderate length was required, because the ferrule tip moved only a short distance between the two locations 60 and 60A.

Figure 3:
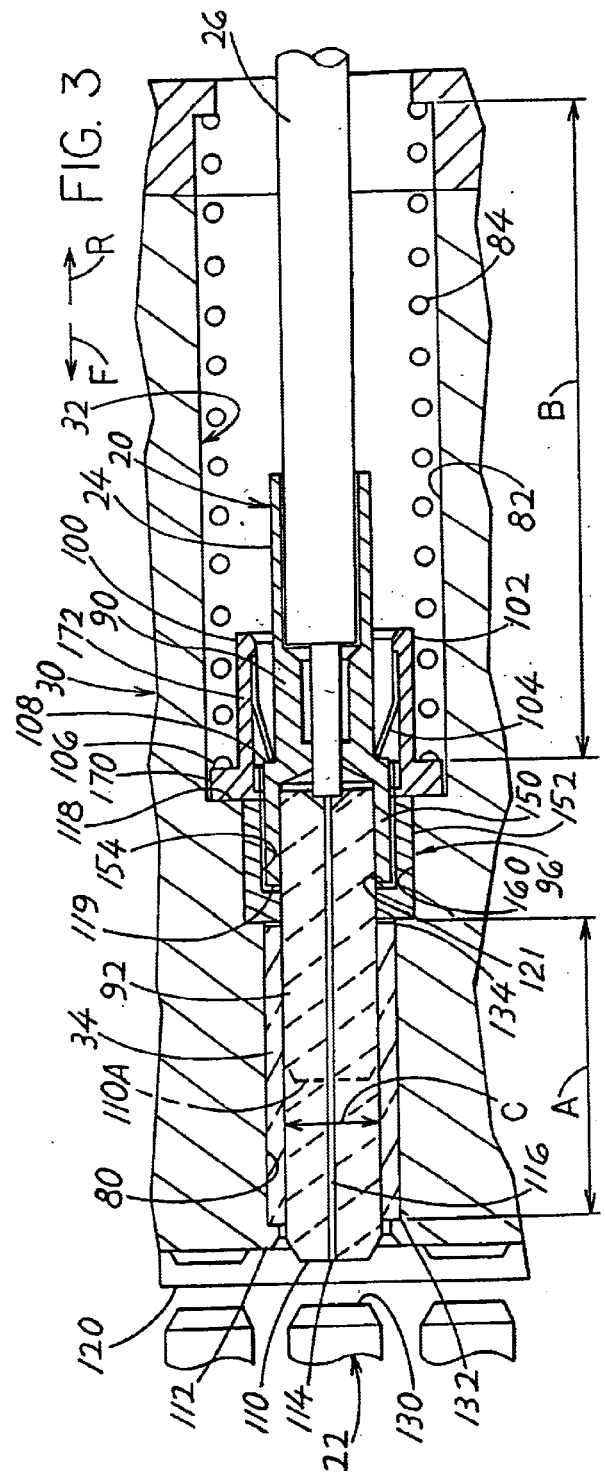
FIG. 3 is a sectional view taken on line 3—3 of FIG. 1.

FIG. 3 illustrates details of the connector 12 of FIG. 1, showing that the connector includes an alignment sleeve 34 of short length A lying in a front portion 80 of the through passage 32 of the housing, and showing that much of the terminus 24 lies in a rear portion 82 of the passage. It is possible to divide the housing into two separate pieces as in FIG. 2, although applicant prefers to use a single piece as shown in FIG. 3. The figure shows that the connector includes a spring 84 of long length B. The terminus 24 includes a terminus body 90 that forms a terminus rear portion and a ferrule 92 that projects into the alignment sleeve 34. A plug 96, which is press fit into a rear part of the passage front portion, holds the alignment sleeve 34 in place. A retainer 100 includes a holder 102 and a clip 104. The front end 106 of the spring presses against the holder 102, while the holder holds the clip in place and presses the clip forwardly so it presses against a shoulder 108 of the terminus body, to push the terminus forwardly.

In the initial position of the terminus, illustrated in solid lines in FIG. 3, the tip 110 of the ferrule projects to a position slightly forward of a front surface 112 of the housing that surrounds the front end of the housing passage 32. This greatly facilitates cleaning of the tip 110 of the terminus and the tip 114 of the optic fiber 116 that extends through a bore in the ferrule and whose tip is flush with that of the terminus. The fact that the tips 110 of the termini project beyond the housing surface 112, results in the possibility that the tips can be scratched or otherwise harmed, as when the connector is laid with its front downward on a surface during handling.

Applicant forms the housing with a peripheral housing portion or shell portion 120 that projects slightly further forward of the tips 110 of the ferrules in their initial position, to provide some protection for them. That is, when the housing is laid on a table top with the ferrule tips 110 downward, the ferrule tips will not touch the table top and possibly be scratched or pick up dust or other material. The cleaning of the tips 110 of the ferrules is greatly enhanced by having them project forward of the housing front surface 112, although cleaning is made much easier by having them at least about flush with the housing front surface 112. The housing front surface 112 is the largely planar surface that lies immediately around the front end of each passage 32, and which extends in a plane between the front ends of the passages.

The initial position of the terminus can be reached when the retainer 100 abuts a largely rearwardly-facing stop shoulder 118 of the housing or when the body front end 119 abuts a stop shoulder of the plug of the housing.

Figure 4:
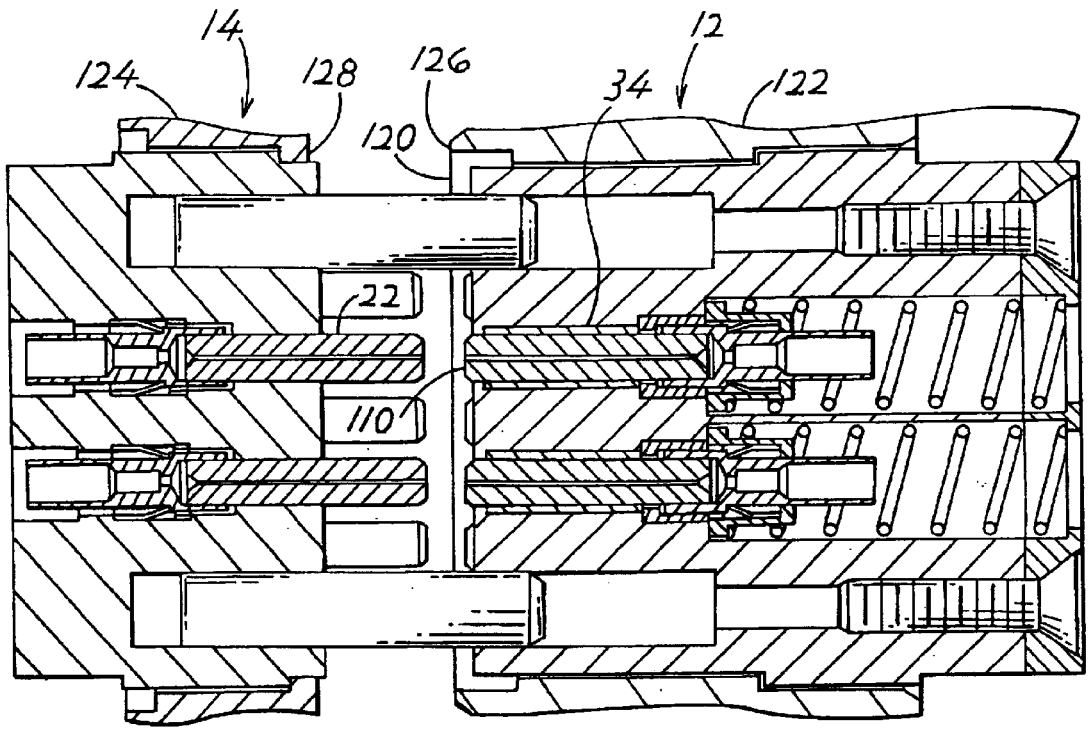
FIG. 4 is an exploded sectional view of a pair of mating connectors similar to those of FIGS. 1 and 3, as the connectors approach each other.
Figure 5:
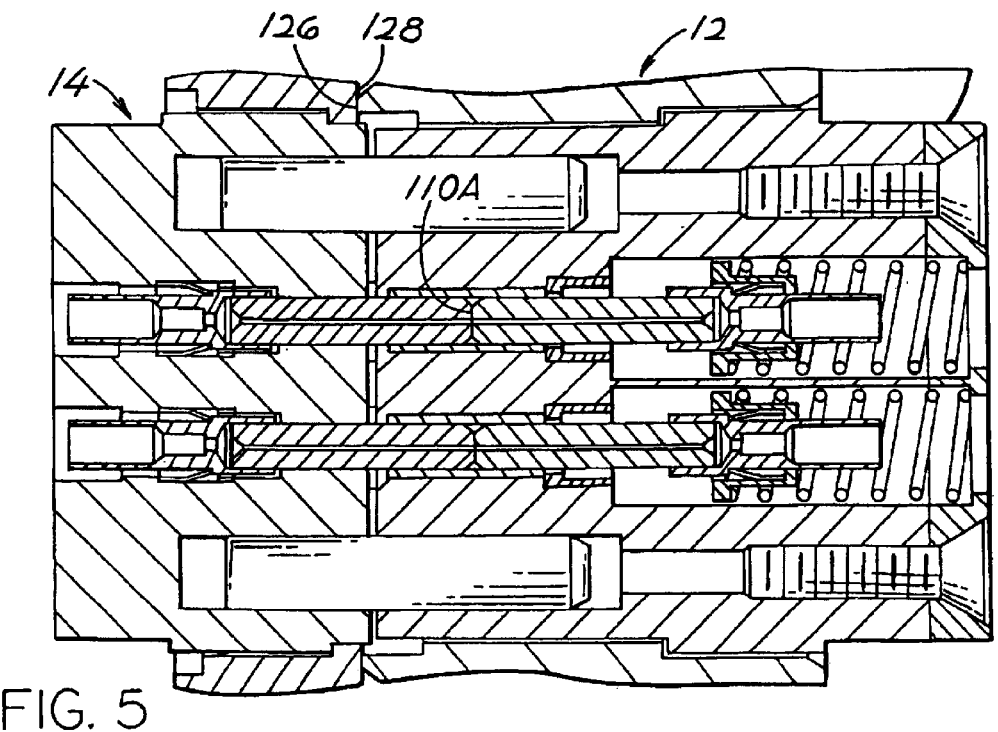
FIG. 5 is a sectional view similar to FIG. 4, after the connectors have fully mated.

FIGS. 4 and 5 show the connectors 12, 14 prior to and after full mating. The connectors have shells 122, 124 with stops 126, 128 that abut one another during mating to limit movement at the full mating position of FIG. 5.

When a mating ferrule tip device 130 (FIG. 3) of a mating ferrule device 22 projects into the alignment sleeve 34, the mating ferrule tip device moves rearward until it lies halfway between opposite ends 132, 134 of the alignment sleeve. The ferrule tip which is initially at 110, then moves rearward to the position 110A. When the mating terminus device 22 is removed, the terminus moves forward until the ferrule tip is at 110, wherein it projects about one-third of ferrule diameter C forward of the alignment sleeve front end 132. The movement of the ferrule tip between positions 110 and 110A is a considerable length of movement. To reduce the length of movement, applicant provides a ferrule of short length A, which is about three times the internal diameter C of the alignment sleeve. In order to assure that each ferrule is accurately aligned with the alignment sleeve 34, the length of the ferrule portion lying within the alignment sleeve and engaging it, should be more than the diameter of the ferrule, which is also the diameter C, so the alignment sleeve should be more than twice the ferrule diameter. An alignment sleeve length more than four times the ferrule diameter is not necessary.

Figure 6:
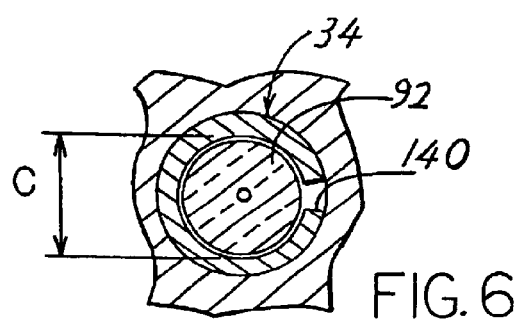
FIG. 6 is a sectional view of the alignment sleeve and of a front part of the ferrule of FIG. 3.

FIG. 6 shows that the alignment sleeve 34 has a gap 140 that allows it to expand. When the ferrule 92 slides forward along the alignment sleeve, it must overcome considerable friction with the alignment sleeve inside surface. To reliably assure that the ferrule will consistently move forward, requires a spring force of about 2.5 pounds for a ferrule 92 having an outside diameter C of 1.5 mm. The spring force should be about constant throughout ferrule movement. To assure almost constant spring force throughout ferrule movement, applicant constructs the spring shown at 84 in FIG. 3, so it has a length B that is at least 150% of the length A of the alignment sleeve. Such a length results in the spring being compressed by about 40% of its initial length, with consequent increase in spring force. The length B of the spring is preferably at least 175% of the sleeve length, and more preferably at least 200% of the alignment sleeve length A. In the connector shown in FIG. 3, the length B of the spring is about 225% of the alignment sleeve length A, so there is only about a 28% compression of the spring from it initial length. Such a long length of the spring can increase the required length of the connector, and it is desirable that steps be taken to reduce the overall length of the connector.

The body 90 of the terminus includes a front portion 150. The plug 96 is press fit into a rear part of the passage front portion 80. Applicant constructs the plug rear portion 152 so it has an enlarged rear bore part 154 that receives the body front portion 150. The plug 96 still has a length that is almost as great as its diameter, so that it forms a reliable press fit in the rear end 160 of the passage front portion, without cocking, but the overall length of the connector is reduced.

The holder 102 of the retainer 100 must be of a moderate length in order to hold a clip 104 of moderate length. The holder has a front portion 170 that abuts the front end 106 of the spring and that lies closely within the passage rear portion 82. Applicant forms the holder with a rear portion 172 of smaller outside diameter, which allows a front portion of the spring to surround the holder rear portion 172. This further decreases the require length of the connector, which has been increased due to the long length of the spring 84.

Thus, the invention provides an optic fiber connector having a housing with one or more through passages that each holds an alignment sleeve and a terminus, and which facilitates cleaning of the tips of the terminus ferrules. In the initial position of the terminus, when it is not mating to another terminus device and lies in its most forward position, the tip of the terminus lies at sufficiently forward to lie at least flush with the housing front surface, that is, to lie least flush with and preferably forward of the surrounding front surface of the housing. The housing has a peripheral housing portion that projects even further forward than the tips of the ferrules, to protect the tips. The alignment sleeve has a reduced length, that is about one-third its inside diameter. A longer spring is used, to assure a substantially constant forward biasing force against the terminus to assure that it will move forward to its most forward position when not mated to another terminus device. The overall length of the connector is reduced by using a plug that holds the alignment sleeve in place, where the plug has an inside diameter that is enlarged along a rearward portion to receive the front portion of the terminus body. A holder of a retainer, has a rear portion of reduced outside diameter to allow the front portion of the spring to lie around the holder rear portion.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optic fiber connector which includes a housing having a front surface and having a plurality of through passages each passage having a terminus-holding rear passage portion and a front passage portion that holds an alignment sleeve, said connector including a plurality of optic fiber termini that each is slideable in forward and rearward directions in the corresponding passage, each terminus having a rear terminus portion lying in a corresponding rear passage portion and a ferrule projecting into said sleeve, and said connector including a plurality of springs each lying in one of said rear passage portions and around at least part of a corresponding terminus and biasing the terminus forwardly, said housing including a stop that limits forward movement of each terminus to a predetermined forward initial ferrule position, wherein;

each ferrule has a front tip, and the lengths of said sleeves and of said ferrules result in said ferrule front tips lying forward of said alignment sleeves and sufficiently forward to lie at least flush with said housing front surface in said forward initial ferrule position;

said housing has a peripheral housing portion that projects forward of said ferrule front tips in their forward initial positions.

2. The connector described in claim 1 including a mating optic fiber connector device which has a plurality of termini devices with projecting ferrule devices for entering said alignment sleeves, and wherein:

said connector and connector device have stop shoulders that abut one another when said connector and connector device are fully mated;

said ferrule devices have tips that project halfway through said alignment sleeves when said stop shoulders abut one another, said ferrule tips also lying halfway through said alignment sleeve wherein said stop shoulders abut.

3. The connector described in claim 1 wherein:

said alignment sleeves each have an inside diameter front and rear ends, and an alignment sleeve length between said ends which is about three times said inside diameter, and each spring has an initial length when the ferrule lies in said initial position, said spring length being at least 150% of said alignment sleeve length.

4. The connector described in claim 3 wherein:

said spring length is at least 200% of said alignment sleeve length.

5. An optic fiber connector which includes a housing with a through passage extending in front and rear longitudinal directions and with a housing front surface that surrounds said passage front end, an alignment sleeve lying in a front portion of said passage and having alignment sleeve front and rear ends, a spring lying in a rear portion of said passage, and a terminus that lies in said passage and that includes a ferrule with a front ferrule portion lying in said alignment sleeve, said ferrule having a front tip, said spring having a front portion that surrounds a portion of said terminus and said spring coupled to said terminus to urge it and its ferrule forward to a most forward initial position while allowing said ferrule to slide rearward until the ferrule tip lies halfway between said alignment sleeve front and rear ends, wherein:

in said most forward position of said ferrule said ferrule tip lies sufficiently forward to lie at least flush with said housing front surface;

said alignment sleeve has a length of about three times its inside diameter and said spring has a length, in said initial position of said ferrule, that is more than 150% of said alignment sleeve length.

6. An optic fiber connector which includes a housing having a front surface and having a plurality of through passages each passage having a terminus-holding rear passage portion and a front passage portion that holds an alignment sleeve, said housing front surface lying around front ends of said passages, said connector including a plurality of optic fiber termini that are slideable in forward and rearward directions in the corresponding passage, each terminus having a terminus rear portion lying in a corresponding rear passage portion and a ferrule projecting into a corresponding one of said sleeves, said housing forming stops that each limits forward movement of a corresponding terminus to a predetermined forward initial ferrule position, including:

a plurality of helical springs that each lies in different one of said rear passage portions and that biases a corresponding terminus forwardly, and each terminus being slideable in forward and rearward directions independently of the other of said termini;

each ferrule has a front tip, and the lengths of said alignment sleeves and of said ferrules result in said ferrule front tips lying forward of said alignment sleeves and flush with or forward of said housing front surface in said forward initial ferrule positions.

7. The connector described in claim 6 wherein:

said housing has a peripheral housing portion that projects forward of said ferrule front tips in their forward initial positions.

8. The connector described in claim 6 including a mating optic fiber connector device which has a plurality of termini devices with projecting ferrule devices for entering said alignment sleeves, and wherein:

said connector and connector device have stop shoulders that abut one another when said connector and connector device are fully mated;

said ferrule devices have device tips that project halfway through said alignment sleeves when said stop shoulders abut one another, said ferrule tips also lying halfway through said alignment sleeve when said stop shoulders abut.

9. The connector described in claim 6 wherein:

said alignment sleeves each has front and rear ends with predetermined inside diameters, and said alignment sleeves each has a predetermined alignment sleeve length between said ends which is about three times said inside diameter, and each spring has an initial length when the ferrule lies in said initial position, said initial length being at least 150% of said alignment sleeve length.

* * * * *